United States Patent [19]

Keck et al.

[11] Patent Number: 5,423,613

[45] Date of Patent: Jun. 13, 1995

[54] TILT PAD JOURNAL BEARING ASSEMBLY WITH SELF-CONTAINED HYDROSTATIC LIFT PROVISIONS

[75] Inventors: Richard J. Keck, Halfmoon; Blake W. Wilson, Scotia, both of N.Y.; Gary G. Wegner, Pewaukee; Thomas R. Byrne, Port Washington, both of Wis.

[73] Assignee: General Electric Co., Schenectady, N.Y.

[21] Appl. No.: 66,278

[22] Filed: May 26, 1993

[51] Int. Cl.6 .................................. F16C 17/03
[52] U.S. Cl. .................................. 384/311; 384/309
[58] Field of Search ............... 384/117, 122, 305–312

[56] References Cited

U.S. PATENT DOCUMENTS

| | | | |
|---|---|---|---|
| 1,919,489 | 7/1933 | Treschow | 384/311 X |
| 2,363,260 | 11/1944 | Peskin | 384/311 |
| 3,604,767 | 9/1971 | Decker | 384/312 |
| 3,917,365 | 11/1975 | Jenness | 384/310 |
| 5,271,676 | 12/1993 | Keck et al. | 384/117 X |

*Primary Examiner*—Thomas R. Hannon
*Attorney, Agent, or Firm*—Nixon & Vanderhye

[57] ABSTRACT

The tilt pad journal bearing assembly includes a conduit within the bearing housing for supplying lubricant hydrostatically to each tilt bearing pad. The conduit includes a flexible segment coupled at respective opposite ends to the tilt pad and to a quick connect/disconnect coupling extending through an aperture in the side wall of the bearing housing. A supply line is coupled to each supply conduit adjacent the side wall by the quick connect/disconnect coupling. The flexible segment within the bearing housing accommodates the rocking motion of the tilt pad and the design and routing of the external supply line is therefore not dependent on any requirements of the bearing assembly. To service the bearing assembly, a set screw is unscrewed, permitting a portion of a coupler, together with a bushing to be withdrawn through the aperture into the interior of the housing for withdrawal with the tilt pad as a discrete sub-assembly.

4 Claims, 2 Drawing Sheets

TILT PAD JOURNAL BEARING ASSEMBLY WITH SELF-CONTAINED HYDROSTATIC LIFT PROVISIONS

TECHNICAL FIELD

The present invention relates to a tilt pad journal bearing assembly with a self-contained hydrostatic lift arrangement for supplying high pressure fluid to the tilt pad and particularly refers to a tilt pad journal bearing assembly having a high pressure, flexible, fluid supply conduit within the bearing housing for facilitating bearing design and installation and removal of the tilt pad.

BACKGROUND

In many tilt pad journal bearing assemblies, tilt pads are provided with a high pressure fluid, i.e., a lubricating oil, providing a thin film bearing surface for lifting the shaft in the absence of a hydrodynamic film. Conduits for supplying the fluid to the tilt pads must accommodate the motion of the pads relative to the fixed bearing components, i.e., the bearing housing, as well as afford ease of servicing. In previous designs, one or more steel pipes were employed within the bearing housing to transmit oil between the stationary bearing housing wall and the tilt pad. O-ring seals were used at each end of the pipe to permit movement of the pad relative to the bearing housing. O-rings, however, have a tendency to leak during flexing and eventually the O-rings wear through use. Another prior design provided a fixed pipe for carrying oil to the tilt pad, the pipe being fixed at one end to the pad and the other end to a flexible hose outside of the bearing housing. A flexible gasket was required to enable movement of the pipe and pad to seal the low pressure oil within the bearing housing assembly where the high pressure piping exits the bearing retainer. The gasket has been found to provide excessive oil leakage. Where a flexible conduit has been used between the tilt pad and a connection to a fluid supply line external to the bearing housing, a tight fitting is still required at the bearing housing. Because there is no access within the bearing housing to disconnect the hose from the tilt pad bearing in order to remove the tilt pad bearing, the entire hose from its external connection with the fluid supply line must be withdrawn through the bearing housing with the tilt pad bearing when the tilt pad bearing is removed for servicing. This external connection not only had to be accessible, but required a particular design of the bearing support to accommodate the connection, the hose and also the flexing of the hose to permit the bearing pad to tilt. This placed a limitation on the design of the support with respect to the type and routing of that portion of the supply line.

DISCLOSURE OF THE INVENTION

According to the present invention, a conduit internal to the bearing housing includes a flexible hose segment between a fitting connecting with the tilt pad and a fitting mounted in the side wall of the bearing housing. The flexible hose segment permits rocking movement of the tilt pad while the fitting at the side of the bearing housing enables connection of the flexible hose segment to the outside or external high pressure fluid supply line. This connection can be any suitable type, for example, a threaded connection. Preferably, however, a quick connect/disconnect connection is provided. More particularly, the fitting includes a bushing which is releasably secured in an aperture in the side wall of the bearing housing. On the external side of the bushing, there is provided a mating portion of the quick connect/disconnect coupler. This portion of the coupler and the bushing itself are sized to enable the bushing and coupler portion to be withdrawn through the aperture into the interior of the bearing housing upon removal of the tilt pad. Consequently, by locating the flexible segment of the supply line internally within the bearing housing and providing a coupler directly adjacent the side of the bearing housing for releasably connecting the fluid supply line to the internal flexible hose segment, the bearing constitutes a stand-alone assembly independent of the design of the bearing housing and/or support. The fluid supply line to the coupler can be a flexible hose or a hard pipe. By disconnecting the coupling between the bearing housing and the fluid supply line at the side wall of the bearing housing, as well as other connections not relevant here, the entire lower half of the bearing housing containing the bushing, the mating portion of the coupling, as well as the flexible hose segment and check valve internal to the bearing, can be removed from the bearing pedestal. With the bearing housing removed, a set screw securing the bushing in the aperture of the bearing housing wall is unscrewed, enabling the mating portion of the coupler and the bushing to be removed with the tilt pad from within the bearing housing. That is, the bushing and coupler can be withdrawn internally first within the bearing housing and then from the bearing housing as the tilt pad is removed from the bearing housing. Installation of the tilt pad after servicing requires the reverse procedure. That is, the bushing, mating portion of the coupler, flexible hose segment, check valve and tilt pad are located within the bearing housing with the bushing and mating coupler portion disposed in the aperture. The set screw is then threaded to secure the bushing in the bearing housing side wall enabling the mating coupler portion to be connected externally of the housing to the fluid supply line.

It will be appreciated that, while the present specification refers to a single tilt pad, plural tilt pads are typically employed in the lower bearing housing and that a separate fluid supply conduit subassembly as described and internal to the bearing housing is provided for each tilt pad.

In accordance with the present invention, there is provided a tilt pad journal bearing assembly comprising a bearing housing having an aperture, a tilt pad carried by the bearing housing for tilting movement, a conduit within the bearing housing for supplying fluid to the tilt pad and passing through the aperture, the conduit including a flexible conduit portion within the bearing housing for flexing in response to tilting movement of the pad, and means accessible externally of the housing for releasably connecting the conduit to a fluid supply line for supplying fluid to the conduit and the tilt pad.

In accordance with a further aspect of the present invention, there is provided a method of removing a tilt pad in a journal bearing housing having an aperture in a side wall and a conduit internal to said bearing housing extending between said tilt pad and in said aperture for coupling to an external fluid supply conduit adjacent the aperture, the conduit having a flexible portion within the bearing housing and a coupling portion accessible external of the housing adjacent the aperture, comprising the steps of disconnecting the external fluid supply conduit and the coupling portion adjacent the aperture, withdrawing the coupling portion through the aperture into the housing by displacing the tilt pad away from the housing, and removing the tilt pad and internal conduit from within the bearing housing.

Accordingly, it is a primary object of the present invention to provide a novel and improved tilt pad bearing assembly with hydrostatic lift which is self-contained within the bearing housing and may be connected and disconnected from an external fluid supply line to facilitate removal of the bearing housing from its support and the bearing tilt pad from the housing and their reinstallation independent of the bearing support design.

BEST MODE FOR CARRYING OUT THE INVENTION

Reference will now be made in detail to a present preferred embodiment of the invention, an example of which is illustrated in the accompanying drawings.

Figure 1:
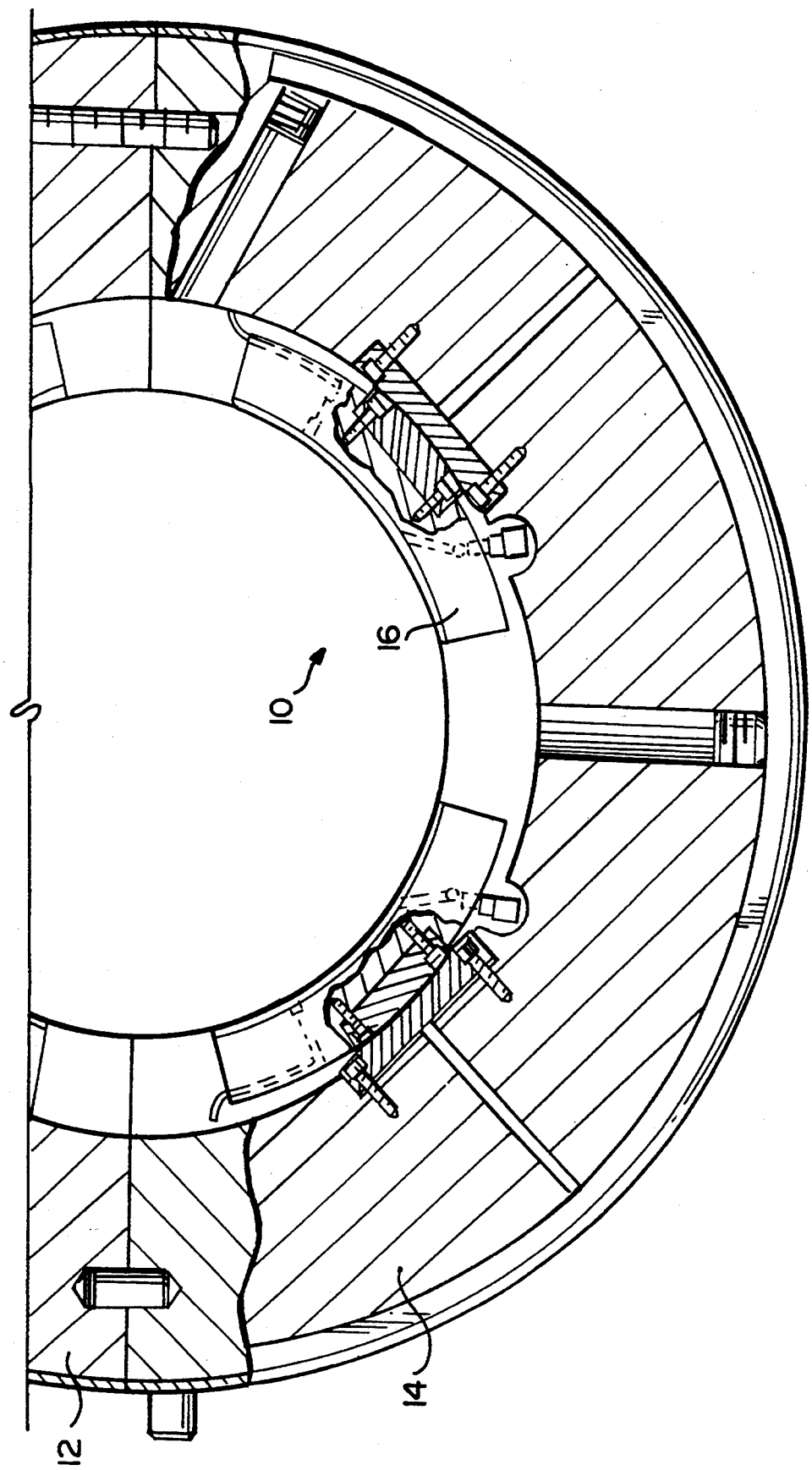
FIG. 1 is a fragmentary end cross-sectional view through a tilt bearing assembly illustrating a portion of the tilt pad mounting and the supply line for the hydrostatic fluid.

Referring now to the drawings, particularly to FIG. 1, there is illustrated a tilt pad journal bearing assembly, generally designated 10, for rotatably mounting a shaft, not shown. Assembly 10 includes upper and lower bearing housing sections 12 and 14, respectively, each mounting a plurality of tilt pads 16 spaced circumferentially one from the other about the axis of the bearing housing. As well known, the tilt pads coupled to the upper housing 12 bear on the rotating shaft for purposes of essentially containing the shaft within the housing and are not provided with high pressure lubricant. The tilt pads 16 in the lower housing 14, however, are each provided with a fluid lubricant under high pressure such that the arcuate bearing surfaces of the tilt pads 16 are provided with thin films of lubricant on which the shaft is supported. The tilt pads 16 rock about an axis parallel to the axis of rotation of the shaft and are mounted within the lower bearing housing 14 in a known manner to facilitate the tilting action of the pads 16.

Figure 2:
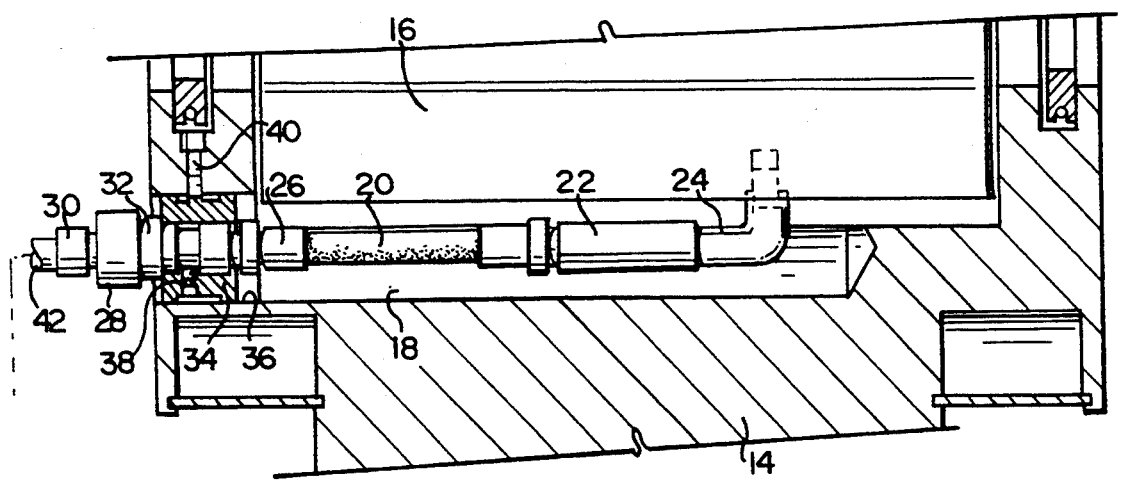
FIG. 2 is an enlarged fragmentary cross-sectional view illustrating the fluid supply connection from a location external to the bearing housing and internally within the bearing housing to the tilt pad.

Referring to FIG. 2, one of tilt pads 16 is illustrated mounted in the lower bearing housing 14, for rocking movement. A chamber 18 is formed along the inner wall surface of the lower bearing housing 14 to accommodate a lubricant conduit within the bearing housing for connection to an external supply line at a location adjacent the side wall of the bearing housing. The pad 16 is supplied with the lubricant from its underside and through suitable passages terminating in fluid supply apertures opening through the inner face of the pad for forming a thin film of lubricant along the face of the pad carrying the shaft.

Particularly, and in accordance with the present invention, the interior lubricant supply conduit includes a segment of flexible conduit 20 at one end connecting with a check valve 22 which, in turn, is coupled to a fitting 24 connected to the outer face of the tilt pad 16. From a review of FIG. 2, it will be appreciated that a portion of the fitting 24, and the check valve 22 and flexible conduit 20 lie within the chamber 18. The opposite end of the flexible conduit 20 attaches to a fitting 26 which is securely connected to the interior end of a coupling 28, preferably a quick connect/disconnect coupling. In the preferred form, coupling 28 comprises a male portion 30 external to the bearing housing and a female portion 32 opening outwardly of the housing 14. The female portion 32 of coupling 28 is received in a bushing 34, which in turn, is received in an aperture 36 formed through a side wall of lower bearing housing 14. The female portion of the coupling 32 has a diametrically recessed portion within bushing 34 and is held in the bushing 34 by a set screw 38. The bushing 34 is maintained within aperture 36 by a set screw 40 accessible, when the bearing housing is removed from the bearing pedestal, from an inner face of the side wall of the bearing housing.

From a review of FIG. 2, it will be appreciated that the diameter of the bushing 34 is larger than or the same as the diameter of the female portion 32 of the quick connect/disconnect coupling 28. This enables, as described hereinafter, the female portion 32 of the coupling 28 to be withdrawn with bushing 34 into the bearing housing 14 through the aperture 36. It will also be appreciated that while a quick connect/disconnect coupling of the type which, for example, may be spring-loaded and require axial pressure on an axially movable portion of the coupler to disconnect the male and female portions one from the other is preferred, any suitable connection may be used, provided the coupling can be disconnected from the external fluid supply line at the bearing housing wall and withdrawn into the bearing housing. While any suitable type of coupling which can be disconnected externally of the bearing housing may be used, it has been found that a quick connect/disconnect coupling of the type manufactured by the Parker Hannifin Company, identified as Parker Quick Coupling, Catalog No. H1-62, is suitable. Also, the flexible conduit 20 may be formed of a material sold by that company under the trade name Parker Parflex PDH-2.

Further, the fluid supply line coupled to the coupler 32 may comprise a flexible or a hard pipe, for example, as illustrated at 42. It will thus be seen that the connection between the fluid supply line and the coupler 32 may be of any type and that the fluid supply line may be routed as desired without dependence upon any requirements for flexibly connecting the fluid conduit within the bearing housing to the tilt pad. In short, the fluid conduit subassembly within the bearing housing, connecting between the side wall of the bearing housing and the tilt pad, is totally independent of any design considerations for the external fluid supply line and its routing.

In using the bearing assembly of the present invention, it will be appreciated that the bearing housing 12 and 14 is secured in a support, not shown, and a fluid supply line 42 is connected to each coupling portion 32 adjacent the side wall of the bearing housing 14. Thus, a separate fluid supply connection is used for each tilt pad in the lower housing. Each tilt pad journal bearing assembly operates in a conventional fashion, with the external supply line and interior conduit supplying lubricant to the inner face of the tilt pad such that the shaft rides on a thin film of lubricant in the lower bearing housing 14. It will be appreciated that the tilting or rocking action of the tilt pad 16 is accommodated by the segment of flexible conduit 20 within the bearing housing without effect on the coupling or the external supply line 42.

Figure 3:
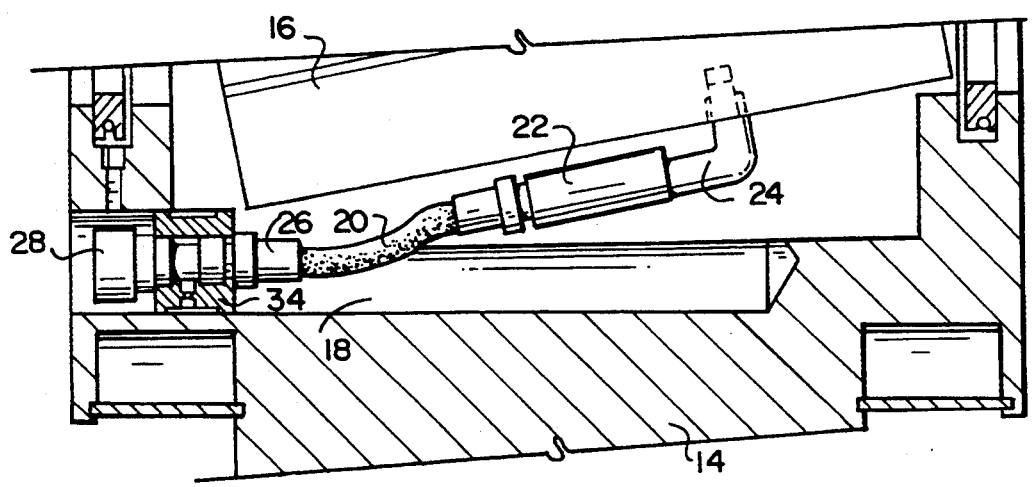
FIG. 3 is a view similar to FIG. 2, illustrating the partial removal of the pad from the bearing housing.

When it is desired to service the bearing, the coupling 28 and supply line 42 are disconnected one from the other. In the preferred form, the male portion 30 of the coupling 28 is quickly released from the female portion 32, leaving only the female portion to project from the side wall of the bearing housing. The bearing housing is then removed from the bearing support together with the projecting female portion of the coupler. The set screw 40 is then unscrewed to release the bushing 34 from its securement to the bearing housing side wall. As illustrated in FIG. 3, the tilt pad 16 may then be removed from the lower bearing housing 14 by withdrawing the bushing and female portion of the coupler 32 into the bearing housing. The entire sub-assembly of the fitting 24, check valve 22, flexible hose 20, fitting 26, female coupling 32, and bushing 34 are then removed from within the interior of the bearing housing.

Once the bearing assembly has been serviced, the tilt pad may be replaced within the bearing housing by the reverse procedure. Particularly, the lubricant supply sub-assembly along the underside of the pad 16 may be located within the bearing housing and the female coupling portion 32 of coupler 28 and the bushing 34 inserted into the aperture 36 in the side wall of the bearing housing. A suitable tool may be used to guide the coupler and bushing into the aperture 36. Once the tilt pad 16 is mounted, the set screw 40 is threaded to secure the bushing 34 and female coupling 32 to the side wall of the bearing housing. Once the bearing housing has been replaced on the bearing support, the external supply lines 42 may be connected to the couplers 28.

It will thus be appreciated that by the foregoing construction, there has been provided a hydrostatic lift arrangement for a tilt pad journal bearing assembly wherein the external design and routing of the lubricant supply line to the bearing housing is not dependent upon the design of the bearing assembly. The flexible supply conduit portion 20 and the check valve are internal to the bearing housing, rendering the bearing a stand-alone assembly rather than dependent on the design of the bearing housing or support where oftentimes the needed flexibility in the lubricant supply line to accommodate the rocking motion of the tilt pad is provided by the external supply line. Inclusion of the flexible element within the bearing housing means that the external supply line can be rigid or flexible and routed as desired at convenient locations independent of the requirements of the tilt pad journal bearing itself. Also, the supply line is readily connected and disconnected at the bearing housing wall in a manner to facilitate ready servicing of the bearing.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A tilt pad journal bearing assembly comprising:
   a bearing housing having an aperture;
   a tilt pad carried by said bearing housing for tilting movement;
   a conduit within said bearing housing for supplying fluid to said tilt pad and, passing through said aperture, said conduit including a flexible conduit portion within said bearing housing for flexing in response to tilting movement of said pad; and
   means accessible externally of said housing for releasably connecting said conduit to a fluid supply line for supplying fluid to said conduit and said tilt pad.

2. An assembly according to claim 1 including a bushing in said aperture, a retainer for releasably retaining said bushing within said aperture whereby, upon release of said retainer, said conduit portion and said bushing may be withdrawn into said bearing housing for removal therefrom with said tilt pad.

3. An assembly according to claim 2 wherein said conduit includes a check valve and a fitting for coupling the tilt pad and conduit to one another.

4. An assembly according to claim 2 wherein said conduit projects outward of said aperture and includes a mating portion of a quick connect/disconnect coupler.

* * * * *

UNITED STATES PATENT AND TRADEMARK OFFICE
CERTIFICATE OF CORRECTION

PATENT NO. : 5,423,613
DATED      : June 13, 1995
INVENTOR(S) : KECK ET AL.

It is certified that error appears in the above-identified patent and that said letters patent is hereby corrected as shown below:

Title page, insert: [73], revise the assignee information as follows: --General Electric Co., Schenectady, New York and Orion Corporation, Grafton, Wisconsin--.

Signed and Sealed this

Fifth Day of September, 1995

Attest:

BRUCE LEHMAN

Attesting Officer

Commissioner of Patents and Trademarks